United States Patent
Kimura et al.

(10) Patent No.: US 7,838,670 B2
(45) Date of Patent: Nov. 23, 2010

(54) NAPHTHALOCYANINE COMPOUND AND METHOD FOR PRODUCING THE SAME

(75) Inventors: Keizo Kimura, Kanagawa (JP); Katsuyoshi Yamakawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/094,515

(22) PCT Filed: Dec. 22, 2006

(86) PCT No.: PCT/JP2006/326300
§ 371 (c)(1),
(2), (4) Date: May 21, 2008

(87) PCT Pub. No.: WO2007/073002
PCT Pub. Date: Jun. 28, 2007

(65) Prior Publication Data
US 2009/0270610 A1    Oct. 29, 2009

(30) Foreign Application Priority Data
Dec. 22, 2005   (JP) ............... 2005-369487

(51) Int. Cl.
*C07B 47/00* (2006.01)
*C07D 487/22* (2006.01)
(52) U.S. Cl. ............... 540/145; 540/140; 540/143
(58) Field of Classification Search ......... 540/145, 540/140, 143
See application file for complete search history.

(56) References Cited

U.S. PATENT DOCUMENTS 5,229,507 A * 7/1993 Baumann et al. ........ 540/140
5,656,752 A * 8/1997 Kipper et al. .............. 540/143

FOREIGN PATENT DOCUMENTS

EP   1 053 868 A2   11/2000
JP   2000-147824 A   5/2000

OTHER PUBLICATIONS

Supplemental Search Report dated Jun. 2, 2010 corresponding to EP Application No. 06843677.3.

* cited by examiner

*Primary Examiner*—James O. Wilson
*Assistant Examiner*—Paul V. Ward
(74) *Attorney, Agent, or Firm*—Sughrue Mion, PLLC

(57) ABSTRACT

A naphthalocyanine compound of formula (I):

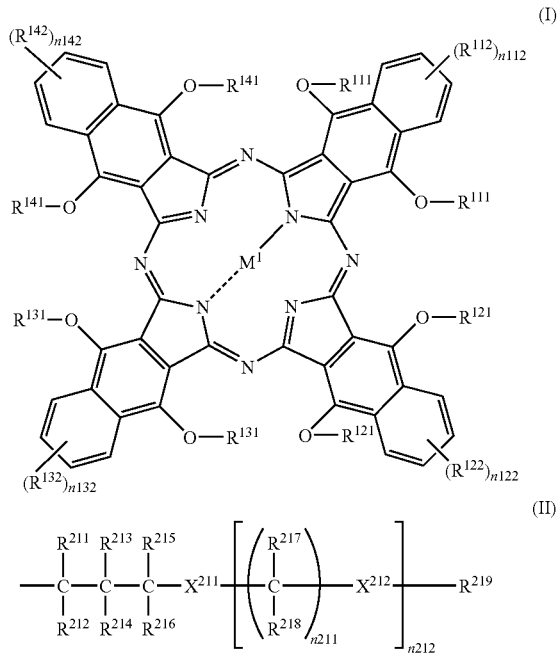

wherein $R^{111}$, $R^{121}$, $R^{131}$ and $R^{141}$ represent a group of formula (II); $R^{112}$, $R^{122}$, $R^{132}$ and $R^{142}$ represent a substituent; $M^1$ represents two hydrogen atoms, two monovalent metal atoms, etc.; n112, n122, n132 and n142 are 0 to 4; $R^{211}$-$R^{218}$ represent H or a substituent; $X^{211}$ and $X^{212}$ represent —O—, —S— or —N($R^{220}$)—; $R^{219}$ and $R^{220}$ represent H, an aliphatic group, etc.; n211 is 2 or more; and n212 is 1 or more.

6 Claims, No Drawings

NAPHTHALOCYANINE COMPOUND AND METHOD FOR PRODUCING THE SAME

TECHNICAL FIELD

The present invention relates to a naphthalocyanine compound useful for image-forming materials, IR-sensitive thermal recording materials, optical recording elements and optical film materials, more precisely to such a novel naphthalocyanine compound having good absorption characteristics. The invention also relates to a method for producing the naphthalocyanine compound.

BACKGROUND ART

Phthalocyanines have been widely used as pigments, and above all, naphthalocyanine compounds have been much studied for near-IR dyes not substantially absorbing visible light but absorbing IR rays (e.g., JP-A-2-296885).

Various types of naphthalocyanine compounds are known, having a substituent on the naphthalene ring of the naphthalocyanine skeleton thereof. Concretely known are those having, as the substituent on the naphthalene ring thereof, a halogen atom, an alkyl group, an aryl group, a hydroxyl group, an alkoxy group, an aryloxy group, an alkylthio group, an arylthio group, an amino group, an alkylamino group, an oxycarbonyl group, an alkoxycarbonyl group, a cyano group, a nitro group (e.g., JP-A-2-296885, Journal of Chemical Society, Parkin Transaction, I, pp. 2453-2458 (1988)); those having an acrylamide group as a polymerization precursor (e.g., JP-A-7-118723); and those having an acylamino group or its precursor (e.g., JP-A-11-152413, JP-A-11-152414 and JP-A-11-152415). Also known are copper naphthalocyanine compounds having a specific alkoxyethyl group on the naphthalene group thereof (e.g., JP-A-2000-147824). However, for image-forming materials, IR-sensitive thermal recording materials, optical recording elements and optical film materials, it is desired to develop naphthalocyanine compounds capable of expressing more excellent capabilities.

DISCLOSURE OF THE INVENTION

An object of the invention is to provide a novel naphthalocyanine compound useful for image-forming materials, IR-sensitive thermal recording materials, optical recording elements and optical film materials. Another object of the invention is to provide a simple method for producing the naphthalocyanine compound.

We, the present inventors have assiduously studied and, as a result, have found that the above objects of the invention can be attained by the following means:

(1) A naphthalocyanine compound of the following formula (I).

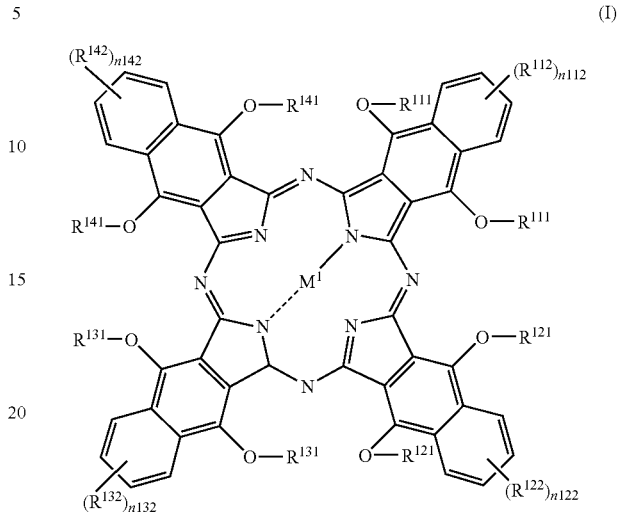

In formula (1), $R^{111}$, $R^{121}$, $R^{131}$ and $R^{141}$ each independently represents a group of the following formula (II); $R^{112}$, $R^{122}$, $R^{132}$ and $R^{142}$ each independently represents a substituent; $M^1$ represents two hydrogen atoms, two monovalent metal atoms, a divalent metal atom, or a substituted metal atom including a trivalent or tetravalent metal atom, but $M^1$ is not a divalent zinc; n112, n122, n132 and n142 each independently indicates an integer of from 0 to 4.

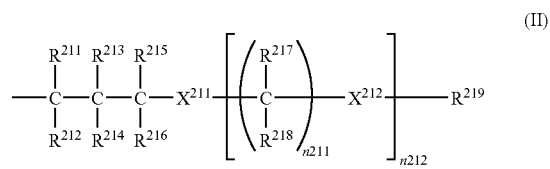

In formula (II), $R^{211}$, $R^{212}$, $R^{213}$, $R^{214}$, $R^{215}$, $R^{216}$, $R^{217}$ and $R^{218}$ each independently represents a hydrogen atom or a substituent; $X^{211}$ and $X^{212}$ each independently represents —O—, —S— or —N($R^{220}$)—; $R^{219}$ and $R^{220}$ each independently represents a hydrogen atom, an aliphatic group, an aromatic group, or a heterocyclic group that bonds via its carbon atom; n211 indicates an integer of 2 or more; n212 indicates an integer of 1 or more; when the formula has plural $R^{217}$'s, $R^{218}$'s, $R^{220}$'s, $X^{212}$'s or n211's, then the plural $R^{217}$'s, the plural $R^{218}$'s, the plural $R^{220}$'s, the plural $X^{212}$'s and the plural n211's may be the same or different; $R^{211}$ and $R^{212}$ bonding to the α-positioned carbon atom relative to the oxygen atom bonding to the naphthalene ring of the naphthalocyanine skeleton are both hydrogen atoms.

(2) The naphthalocyanine compound of (1), wherein $M^1$ is two hydrogen atoms, or a divalent copper atom.

(3) The naphthalocyanine compound of (1) or (2), wherein $X^{211}$ and $X^{212}$ are all —O—.

(4) The naphthalocyanine compound of any one of (1) to (3), wherein n112, n122, n132 and n142 are all 0.

(5) A method for producing a naphthalocyanine compound of the following formula (IA), which comprises reacting a compound of the following formula (III) with a metal compound.

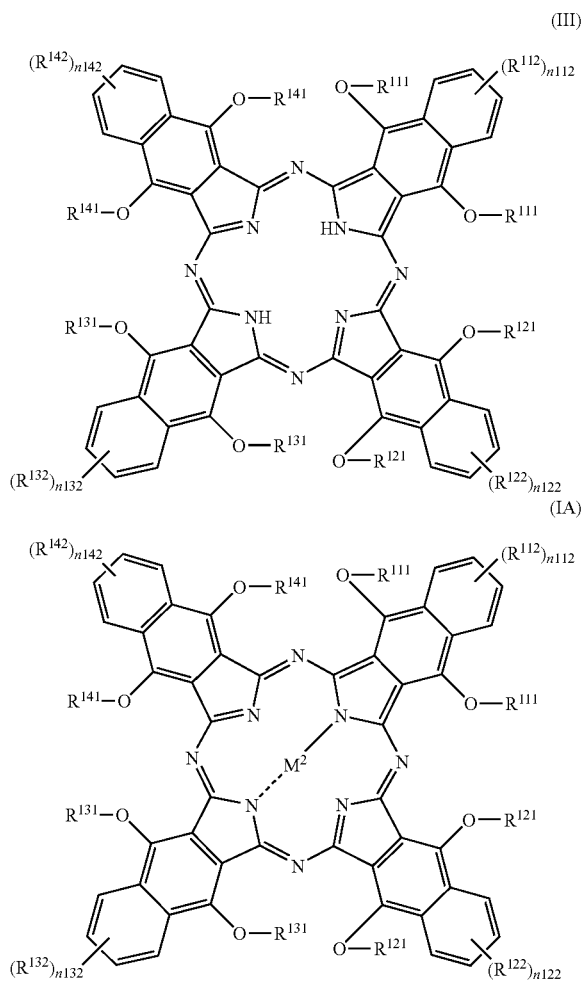

In formulae (III) and (IA), $R^{111}$, $R^{112}$, $R^{121}$, $R^{122}$, $R^{131}$, $R^{132}$, $R^{141}$, $R^{142}$, n112, n122, n132 and n142 have the same meanings as in formula (I); $M^2$ represents a divalent metal atom, or a substituted metal atom including a trivalent or tetravalent metal atom, but $M^2$ is not a divalent zinc.

(6) The method of (5), wherein the metal compound is an acetate salt.

The invention provides a novel naphthalocyanine compound useful for image-forming materials, IR-sensitive thermal recording materials, optical recording elements and optical film materials. The naphthalocyanine compound can be produced in a simplified manner according to the production method of the invention.

BEST MODE FOR CARRYING OUT THE INVENTION

The compound of the invention is described in detail hereinunder. The description of the constitutive elements of the invention given hereinunder may be for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

The definitions of the substituents in this description are described.

In this description, "aliphatic group" means an alkyl group, a substituted alkyl group, an alkenyl group, a substituted alkenyl group, an alkynyl group, a substituted alkynyl group, an aralkyl group and a substituted aralkyl group. The alkyl group may be branched, and may form a ring (as a cycloalkyl group). Preferably, the alkyl group has from 1 to 20 carbon atoms, more preferably from 1 to 18 carbon atoms. The alkyl moiety of the substituted alkyl group may be the same as the above-mentioned alkyl group. The alkenyl group may be branched, and may form a ring (as a cycloalkenyl group). Preferably, the alkenyl group has from 2 to 20 carbon atoms, more preferably from 2 to 18 carbon atoms. The alkenyl moiety of the substituted alkenyl group may be the same as the above-mentioned alkenyl group. The alkynyl group may be branched, and may form a ring (as a cycloalkynyl group). Preferably, the alkynyl group has from 2 to 20 carbon atoms, more preferably from 2 to 18 carbon atoms. The alkynyl moiety of the substituted alkynyl group may be the same as the above-mentioned alkynyl group. The alkyl moiety of the aralkyl group and the substituted aralkyl group may be the same as the above-mentioned alkyl group. The aryl moiety of the aralkyl group and the substituted aryl group may be the same as the aryl group mentioned below.

The substituent in the substituted alkyl group, the substituted alkenyl group, the substituted alkynyl group and the alkyl moiety of the substituted aralkyl group includes, for example, a halogen atom (e.g., chlorine atom, bromine atom, iodine atom), an alkyl group [this is a linear, branched or cyclic, substituted or unsubstituted alkyl group, including an alkyl group (preferably an alkyl group having from 1 to 30 carbon atoms, such as a methyl group, an ethyl group, an n-propyl group, an isopropyl group, a t-butyl group, an n-octyl group, an eicosyl group, a 2-chloroethyl group, a 2-cyanoethyl group, a 2-ethylhexyl group), a cycloalkyl group (preferably a substituted or unsubstituted cycloalkyl group having from 3 to 30 carbon atoms, such as a cyclohexyl group, a cyclopentyl group, a 4-n-dodecylcyclohexyl group), a bicycloalkyl group (preferably a substituted or unsubstituted bicycloalkyl group having from 5 to 30 carbon atoms, or that is, a monovalent group derived from a bicycloalkane having from 5 to 30 carbon atoms, by removing one hydrogen atom from it, such as a bicyclo[1.2.2]heptan-2-yl group, a bicyclo [2.2.2]octane-3-yl group), and a tricyclo-structured group having a larger number of ring structures—the alkyl group in the substituents described hereinunder (e.g., the alkyl group of an alkylthio group) means the alkyl group of this concept], an alkenyl group [this is a linear, branched or cyclic, substituted or unsubstituted alkenyl group, including an alkenyl group (preferably a substituted or unsubstituted alkenyl group having from 2 to 30 carbon atoms, such as a vinyl group, an allyl group, a prenyl group, a geranyl group, an oleyl group), a cycloalkenyl group (preferably a substituted or unsubstituted cycloalkenyl group having from 3 to 30 carbon atoms, or that is, a monovalent group derived from a cycloalkene having from 3 to 30 carbon atoms, by removing one hydrogen atom from it, such as a 2-cyclopenten-1-yl group, a 2-cyclohexen-1-yl group), a bicycloalkenyl group (a substituted or unsubstituted bicycloalkenyl group preferably having from 5 to 30 carbon atoms, or that is, a monovalent group derived from a bicycloalkene having one double bond, by removing one hydrogen atom from it, such as a bicyclo[2.2.1] hept-2-en-1-yl group, a bicyclo[2.2.2]oct-2-en-4-yl group)], an alkynyl group (preferably a substituted or unsubstituted alkynyl group having from 2 to 30 carbon atoms, such as an ethynyl group, a propargyl group, a trimethylsilylethynyl group), an aryl group (preferably a substituted or unsubstituted aryl group having from 6 to 30 carbon atoms, such as a phenyl group, a p-tolyl group, a naphthyl group, an m-chlorophenyl group, an o-hexadecanoylaminophenyl group), a heterocyclic group (preferably a monovalent group derived from a 5- or 6-membered, substituted or unsubstituted, aromatic or non-aromatic heterocyclic compound, by removing one hydrogen atom from it, more preferably a 5- or 6-membered aromatic heterocyclic group having from 3 to 30 carbon atoms, such as a 2-furyl group, a 2-thienyl group, a 2-pyrimidinyl group, a 2-benzothiazolyl group), a cyano group, a hydroxyl group, a nitro group, a carboxyl group, an alkoxy group (preferably a substituted or unsubstituted alkoxy group having from 1 to 30 carbon atoms, such as a methoxy group, an ethoxy group, an isopropoxy group, a tert-butoxy group, an n-octyloxy group, a 2-methoxyethoxy group), an aryloxy group (preferably a substituted or unsubstituted aryloxy group having from 6 to 30 carbon atoms, such as a phenoxy group, a 2-methylphenoxy group, a 4-tert-butylphenoxy group, a 3-nitrophenoxy group, a 2-tetradecanoylaminophenoxy group), a silyloxy group (preferably a silyloxy group having from 3 to 20 carbon atoms, such as a trimethylsilyloxy group, a tert-butyldimethylsilyloxy group), a heterocyclic-oxy group (preferably a substituted or unsubstituted heterocyclic-oxy group having from 2 to 30 carbon atoms, such as a 1-phenyltetrazolyl-5-oxy group, a 2-tetrahydropyranyloxy group), an acyloxy group (preferably a formyloxy group, a substituted or unsubstituted alkylcarbonyloxy group having from 2 to 30 carbon atoms, a substituted or unsubstituted arylcarbonyloxy group having from 6 to 30 carbon atoms, such as a formyloxy group, an acetyloxy group, a pivaloyloxy group, a stearoyloxy group, a benzoyloxy group, a p-methoxyphenylcarbonyloxy group), a carbamoyloxy group (preferably a substituted or unsubstituted carbamoyloxy group having from 1 to 30 carbon atoms, such as an N,N-dimethylcarbamoyloxy group, an N,N-diethylcarbamoyloxy group, a morpholinocarbonyloxy group, an N,N-di-n-octylaminocarbonyloxy group, an N-n-octylcarbamoyloxy group), an alkoxycarbonyloxy group (preferably a substituted or unsubstituted alkoxycarbonyloxy group having from 2 to 30 carbon atoms, such as a methoxycarbonyloxy group, an ethoxycarbonyloxy group, a tert-butoxycarbonyloxy group, an n-octylcarbonyloxy group), an aryloxycarbonyloxy group (preferably a substituted or unsubstituted aryloxycarbonyloxy group having from 7 to 30 carbon atoms, such as a phenoxycarbonyloxy group, a p-methoxyphenoxycarbonyloxy group, a p-n-hexadecyloxyphenoxycarbonyloxy group), an amino group (preferably an amino group, a substituted or unsubstituted alkylamino group having from 1 to 30 carbon atoms, a substituted or unsubstituted anilino group having from 6 to 30 carbon atoms, such as an amino group, a methylamino group, a dimethylamino group, an anilino group, an N-methylanilino group, a diphenylamino group), an acylamino group (preferably, a formylamino group, a substituted or unsubstituted alkylcarbonylamino group having from 1 to 30 carbon atoms, a substituted or unsubstituted arylcarbonylamino group having from 6 to 30 carbon atoms, such as a formylamino group, an acetylamino group, a pivaloylamino group, a lauroylamino group, a benzoylamino group, a 3,4,5-tri-n-octyloxyphenylcarbonylamino group), an aminocarbonylamino group (preferably a substituted or unsubstituted aminocarbonylamino group having from 1 to 30 carbon atoms, such as a carbamoylamino group, an N,N-dimethylaminocarbonylamino group, an N,N-diethylaminocarbonylamino group, a morpholinocarbonylamino group), an alkoxycarbonylamino group (preferably a substituted or unsubstituted alkoxycarbonylamino group having from 2 to 30 carbon atoms, such as a methoxycarbonylamino group, an ethoxycarbonylamino group, a tert-butoxycarbonylamino group, an n-octadecyloxycarbonylamino group, an N-methyl-methoxycarbonylamino group), an aryloxycarbonylamino group (preferably a substituted or unsubstituted aryloxycarbonylamino group having from 7 to 30 carbon atoms, such as a phenoxycarbonylamino group, a p-chlorophenoxycarbonylamino group, an m-n-octyloxyphenoxycarbonylamino group), a sulfamoylamino group (preferably a substituted or unsubstituted sulfamoylamino group having from 0 to 30 carbon atoms, such as a sulfamoylamino group, an N,N-dimethylaminosulfonylamino group, an N-n-octylaminosulfonylamino group), an alkyl or arylsulfonylamino group (preferably a substituted or unsubstituted alkylsulfonylamino group having from 1 to 30 carbon atoms, a substituted or unsubstituted arylsulfonylamino group having from 6 to 30 carbon atoms, such as a methylsulfonylamino group, a butylsulfonylamino group, a phenylsulfonylamino group, a 2,3,5-trichlorophenylsulfonylamino group, a p-methylsulfonylamino group), a mercapto group, an alkylthio group (preferably a substituted or unsubstituted alkylthio group having from 1 to 30 carbon atoms, such as a methylthio group, an ethylthio group, an n-hexadecylthio group), an arylthio group (preferably a substituted or unsubstituted arylthio group having from 6 to 30 carbon atoms, such as a phenylthio group, a p-chlorophenylthio group, an m-methoxyphenyl group), a heterocyclic-thio group (preferably a substituted or unsubstituted heterocyclic-thio group having from 2 to 30 carbon atoms, such as a 2-benzothiazolylthio group, a 1-phenyltetrazol-5-ylthio group), a sulfamoyl group (preferably a substituted or unsubstituted sulfamoyl group having from 0 to 30 carbon atoms, such as an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, an N-(N'-phenylcarbamoyl)sulfamoyl group), a sulfo group, an alkyl or arylsulfinyl group (preferably a substituted or unsubstituted alkylsulfinyl group having from 1 to 30 carbon atoms, a substituted or unsubstituted arylsulfinyl group having from 6 to 30 carbon atoms, such as a methylsulfinyl group, an ethylsulfinyl group, a phenylsulfinyl group, a p-methylphenylsulfinyl group), an alkyl or arylsulfonyl group (preferably a substituted or unsubstituted alkylsulfonyl group having from 1 to 30 carbon atoms, a substituted or unsubstituted arylsulfonyl group having from 6 to 30 carbon atoms, such as a methylsulfonyl group, an ethylsulfonyl group, a phenylsulfonyl group, a p-methylphenylsulfonyl group), an acyl group (preferably a formyl group, a substituted or unsubstituted alkylcarbonyl group having from 2 to 30 carbon atoms, a substituted or unsubstituted arylcarbonyl group having from 7 to 30 carbon atoms, a substituted or unsubstituted heterocyclic-carbonyl group having from 4 to 30 carbon atoms, bonding to the carbonyl group via its carbon atom, such as an acetyl group, a pivaloyl group, a 2-chloroacetyl group, a stearoyl group, a benzoyl group, a p-n-octyloxyphenylcarbonyl group, a 2-pyridylcarbonyl group, a 2-furylcarbonyl group), an aryloxycarbonyl group (preferably a substituted or unsubstituted aryloxycarbonyl group having from 7 to 30 carbon atoms, such as a phenoxycarbonyl group, an o-chlorophenoxycarbonyl group, an m-nitrophenoxycarbonyl group, a p-tert-butylphenoxycarbonyl group), an alkoxycarbonyl group (preferably a substituted or unsubstituted alkoxycarbonyl group having from 2 to 30 carbon atoms, such as a methoxycarbonyl group, an ethoxycarbonyl group, a tert-butoxycarbonyl group, an n-octadecyloxycarbonyl group), a carbamoyl group (preferably a substituted or unsubstituted carbamoyl group having from 1 to 30 carbon atoms, such as a carbamoyl group, an N-methylcarbamoyl group, an N,N-dimethylcarbamoyl group, an N,N-di-n-octylcarbamoyl group, an N-(methylsulfonyl)carbamoyl group), an aryl or heterocyclic-azo group (preferably a substituted or unsubstituted arylazo group having from 6 to 30 carbon atoms, a substituted or unsubstituted heterocyclic-azo group having from 3 to 30 carbon atoms, such as a phenylazo group, a p-chlorophenylazo group, a 5-ethylthio-1,3,4-thiadiazol-2-ylazo group), an imido group (preferably an N-succinimido group, an N-phthalimido group), a phosphino group (preferably a substituted or unsubstituted phosphino group having from 2 to 30 carbon atoms, such as a dimethylphosphino group, a diphenylphosphino group, a methylphenoxyphosphino group), a phosphinyl group (preferably a substituted or unsubstituted phosphinyl group having from 2 to 30 carbon atoms, such as a phosphinyl group, a dioctyloxyphosphinyl group, a diethoxyphosphinyl group), a phosphinyloxy group (preferably a substituted or unsubstituted phosphinyloxy group having from 2 to 30 carbon atoms, such as a diphenoxyphosphinyloxy group, a dioctyloxyphosphinyloxy group), a phosphinylamino group (preferably a substituted or unsubstituted phosphinylamino group having from 2 to 30 carbon atoms, such as a dimethoxyphosphinylamino group, a dimethylaminophosphinylamino group), a silyl group (preferably a substituted or unsubstituted silyl group having from 3 to 30 carbon atoms, such as a trimethylsilyl group, a tert-butyldimethylsilyl group, a phenyldimethylsilyl group).

Of those having a hydrogen atom in the above-mentioned functional groups, the hydrogen atom may be removed and may be substituted with any of the above-mentioned groups. Examples of the functional groups of the type are an alkylcarbonylaminosulfonyl group, an arylcarbonylaminosulfonyl group, an alkylsulfonylaminocarbonyl group, an arylsulfonylaminocarbonyl group. Their concrete examples are a methylsulfonylaminocarbonyl group, a p-methylphenylsulfonylaminocarbonyl group, an acetylaminosulfonyl group, a benzoylaminosulfonyl group.

The substituents for the aryl moiety in the substituted aralkyl group include those for the substituted amino group mentioned below.

In this description, the aromatic group means an aryl group and a substituted aryl group. The aromatic group may be condensed with an aliphatic ring or a heterocyclic ring or with any other aromatic ring. Preferably, the aromatic group has from 6 to 40 carbon atoms, more preferably from 6 to 30 carbon atoms, even more preferably from 6 to 20 carbon atoms. Of those, the aryl group is preferably a phenyl group or a naphthyl group, more preferably a phenyl group.

The aryl moiety of the substituted aryl group may be the same as the above-mentioned aryl group. Examples of the substituents for the substituted aryl group include those mentioned hereinabove for the substituents for the substituted alkyl group, the substituted alkenyl group, the substituted alkynyl group, and those for the alkyl moiety of the substituted aralkyl group.

In this description, the heterocyclic group preferably includes a 5-membered or 6-membered saturated or unsaturated hetero ring. The hetero ring may be condensed with an aliphatic ring or aromatic ring or with any other hetero ring. Preferred examples of the ring-constituting hetero atom of the heterocyclic group are B, N, O, S, Se and Te; more preferred are N, O and S. Of the heterocyclic group, the carbon atom preferably has a free atomic valence (monovalent). Specifically, it is desirable that the heterocyclic group has a carbon atom at the bonding position thereof, and it bonds to the adjacent group via the carbon atom. Preferably, the heterocyclic group has from 1 to 40 carbon atoms, more preferably from 1 to 30 carbon atoms, even more preferably from 1 to 20 carbon atoms. Examples of the saturated hetero ring for the heterocyclic group are a pyrrolidine ring, a morpholine ring, a 2-bora-1,3-dioxolan ring and 1,3-thiazolidine ring. Examples of the unsaturated hetero ring for the heterocyclic group are an imidazole ring, a thiazole ring, a benzothiazole ring, a benzoxazole ring, a benzotriazole ring, a benzoselenazole ring, a pyridine ring, a pyrimidine ring and a quinoline ring. The heterocyclic group may have a substituent. The substituent includes those mentioned hereinabove for the substituent of the substituted alkyl group, the substituted alkenyl group, the substituted alkynyl group and the alkyl moiety of the substituted aralkyl group.

The compounds of formula (I) are described below.

In formula (I), $R^{112}$, $R^{122}$, $R^{132}$ and $R^{142}$ each independently represents a substituent. The substituent includes those mentioned hereinabove for the substituent of the substituted alkyl group, the substituted alkenyl group, the substituted alkynyl group and the alkyl moiety of the substituted aralkyl group. Plural $R^{112}$'s, if any, may bond to each other to form a cyclic structure. The same shall apply to $R^{122}$'s, $R^{132}$'s, $R^{142}$'s. Preferably, $R^{112}$, $R^{122}$, $R^{132}$ and $R^{142}$ each are a halogen atom, an alkyl group, an alkenyl group, an alkynyl group, an aryl group, a cyano group, a hydroxyl group, a nitro group, a carboxyl group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic-thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, a silyl group; more preferably a halogen atom, an alkyl group, an aryl group, a cyano group, a hydroxyl group, a nitro group, a carboxyl group, an alkoxy group, an aryloxy group, a silyloxy group, a heterocyclic-oxy group, an acyloxy group, a carbamoyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic-thio group, a sulfamoyl group, a sulfo group, an alkyl or arylsulfinyl group, an alkyl or arylsulfonyl group, a carbamoyl group, an imido group, a phosphino group, a phosphinyl group, a phosphinyloxy group, a phosphinylamino group, a silyl group; even more preferably a halogen atom, an alkyl group, an aryl group, a hydroxyl group, an alkoxy group, an aryloxy group, an amino group, a mercapto group, an alkylthio group, an arylthio group, a sulfamoyl group, a sulfo group, an alkyl or arylsulfinyl group, an alkyl or arylsulfonyl group; still more preferably a halogen atom, an alkyl group, an aryl group, an alkoxy group, an aryloxy group, an alkylthio group, an arylthio group; further more preferably a halogen atom, an alkyl group having from 1 to 20 carbon atoms, an aryl group having from 6 to 20 carbon atoms, an alkoxy group having from 1 to 20 carbon atoms, an aryloxy group having from 6 to 20 carbon atoms, an alkylthio group having from 1 to 20 carbon atoms, an arylthio group having from 6 to 20 carbon atoms; still further preferably an alkyl group having from 1 to 8 carbon atoms, an aryl group having from 6 to 10 carbon atoms, an alkoxy group having from 1 to 8 carbon atoms, an aryloxy group having from 6 to 10 carbon atoms, an alkylthio group having from 1 to 8 carbon atoms, an arylthio group having from 6 to 10 carbon atoms; even further preferably an alkoxy group having from 1 to 6 carbon atoms, an aryloxy group having from 6 to 8 carbon atoms, an alkylthio group having from 1 to 6 carbon atoms, an arylthio group having from 6 to 8 carbon atoms.

n112, n122, n132 and n142 are preferably from 0 to 3, more preferably from 0 to 2, even more preferably 0 or 1, most preferably 0.

$M^1$ represents two hydrogen atoms, two monovalent metal atoms, a divalent metal atom, or a substituted metal atom including a trivalent or tetravalent metal atom.

The monovalent metal atom for $M^1$ includes an alkali metal (e.g., $Li^+$, $Na^+$, $K^+$); the divalent metal atom includes $Be^{2+}$, $Mg^{2+}$, $Ca^{2+}$, $Ti^{2+}$, $Mn^{2+}$, $Fe^{2+}$, $Co^{2+}$, $Ni^{2+}$, $Cu^{2+}$, $Ru^{2+}$, $Rh^{2+}$, $Pd^{2+}$, $Pt^{2+}$, $Ba^{2+}$, $Cd^{2+}$, $Hg^{2+}$, $Pb^{2+}$, $Sn^{2+}$; and the trivalent or tetravalent metal atom includes Al, Ga, Mn, Fe, Ru, Cr, Si, Zr, Ge, Sn, Ti. The substituent in the substituted metal atom includes a halogen atom, a hydroxyl group, an oxygen atom, an aliphatic-oxy group, an aromatic-oxy group, an aliphatic-thio group, an aromatic-thio group.

$M^1$ preferably two hydrogen atoms; two $Li^{+'}$s, $Na^{+'}$s, $K^{+'}$s, $Rb^{+'}$s, $Cs^{+'}$s; or $Be^{2+}$, $Mg^{2+}$, $Ca^{2+}$, $Ti^{2+}$, $Mn^{2+}$, $Fe^{2+}$, $Co^{2+}$, $Ni^{2+}$, $Cu^{2+}$, $Ru^{2+}$, $Rh^{2+}$, $Pd^{2+}$, $Pt^{2+}$, $Ba^{2+}$, $Cd^{2+}$, $Hg^{2+}$, $Pb^{2+}$, $Sn^{2+}$; or Al—Cl, Al—Br, Al—F, Al—I, Ga—Cl, Ga—F, Ga—I, Ga—Br, In—Cl, In—Br, In—I, In—F, Tl—Cl, Tl—Br, Tl—I, Tl—F, Mn—OH, Fe—Cl, Ru—Cl, $CrCl_2$, $SiCl_2$, $SiBr_2$, $SiF_2$, $SiI_2$, $ZrCl_2$, $GeCl_2$, $GeBr_2$, $GeI_2$, $GeF_2$, $SnCl_2$, $SnBr_2$, $SnI_2$, $SnF_2$, $TiCl_2$, $TiBr_2$, $TiF_2$, $Si(OH)_2$, $Ge(OH)_2$, $Zr(OH)_2$, $Mn(OH)_2$, $Sn(OH)_2$, $TiR_2$, $CrR_2$, $SiR_2$, $SnR_2$, $GeR_2$, $Si(OR)_2$, $Sn(OR)_2$, $Ge(OR)_2$, $Ti(OR)_2$, $Cr(OR)_2$, $Sn(SR)_2$, $Ge(SR)_2$ [where R represents an aliphatic group, or an aromatic group], VO, MnO or TiO; more preferably, two hydrogen atoms, or two $Li^{+'}$s, $Na^{+'}$s, $K^{+'}$s, $Rb^{+'}$s, or $Be^{2+}$, $Mg^{2+}$, $Ca^{2+}$, $Ti^{2+}$, $Mn^{2+}$, $Fe^{2+}$, $Co^{2+}$, $Ni^{2+}$, $Cu^{2+}$, $Ru^{2+}$, $Rh^{2+}$, $Pd^{2+}$, $Pt^{2+}$, $Ba^{2+}$, $Sn^{2+}$, or Al—Cl, Al—Br, Ga—Cl, Ga—F, Ga—I, Ga—Br, In—Cl, In—Br, Tl—Cl, Tl—Br, Mn—OH, Fe—Cl, Ru—Cl, $CrCl_2$, $SiCl_2$, $SiBr_2$, $ZrCl_2$, $GeCl_2$, $GeBr_2$, $SnCl_2$, $SnBr_2$, $TiCl_2$, $TiBr_2$, $Si(OH)_2$, $Ge(OH)_2$, $Zr(OH)_2$, $Mn(OH)_2$, $Sn(OH)_2$, $TiR_2$, $CrR_2$, $SiR_2$, $SnR_2$, $GeR_2$, $Si(OR)_2$, $Sn(OR)_2$, $Ge(OR)_2$, $Ti(OR)_2$, Cr$(OR)_2$, $Sn(SR)_2$, $Ge(SR)_2$ [where R represents an aliphatic group, or an aromatic group], VO, MnO or TiO; even more preferably, two hydrogen atoms, or two $Li^{+'}$s, $Na^{+'}$s, $K^{+'}$s, or $Be^{2+}$, $Mg^{2+}$, $Ca^{2+}$, $Ti^{2+}$, $Mn^{2+}$, $Fe^{2+}$, $Co^{2+}$, $Ni^{2+}$, $Cu^{2+}$, $Ru^{2+}$, $Rh^{2+}$, $Pd^{2+}$, $Pt^{2+}$, $Ba^{2+}$, $Sn^{2+}$, or Al—Cl, Ga—Cl, In—Cl, Tl—Cl, Mn—OH, Fe—Cl, Ru—Cl, $CrCl_2$, $SiCl_2$, $ZrCl_2$, $GeCl_2$, $TiCl_2$, $Si(OH)_2$, $Ge(OH)_2$, $Zr(OH)_2$, $Mn(OH)_2$, $TiR_2$, $CrR_2$, $SiR_2$, $GeR_2$, $Si(OR)_2$, $Ge(OR)_2$, $Ti(OR)_2$, $Cr(OR)_2$, [where R represents an aliphatic group, or an aromatic group], VO, MnO or TiO. Still more preferably, $M^1$ is two hydrogen atoms or $Cu^{2+}$; most preferably $Cu^{2+}$.

$R^{111}$, $R^{121}$, $R^{131}$ and $R^{141}$ each independently represents a group of the above-mentioned formula (II). In formula (II), $R^{211}$, $R^{212}$, $R^{213}$, $R^{214}$, $R^{215}$, $R^{216}$, $R^{217}$ and $R^{218}$ each are preferably a hydrogen atom, an aliphatic group, an aromatic group, a heterocyclic group, a halogen atom, a hydroxyl group, an ether group (alkoxy group, aryloxy group, heterocyclic-oxy group), or an amino group (amino group, alkylamino group, arylamino group, heterocyclic amino group); more preferably a hydrogen atom, an alkyl group, an alkenyl group, an aryl group, a hydroxyl group, an ether group or an amino group; even more preferably a hydrogen atom, an alkyl group having from 1 to 20 carbon atoms, an alkenyl group having from 2 to 20 carbon atoms, an aryl group having from 6 to 20 carbon atoms, a hydroxyl group, an ether group having from 1 to 20 carbon atoms, or an amino group having from 1 to 20 carbon atoms; still more preferably a hydrogen atom, an alkyl group having from 1 to 10 carbon atoms, an alkenyl group having from 2 to 10 carbon atoms, an aryl group having from 6 to 10 carbon atoms, a hydroxyl group, an ether group having from 1 to 10 carbon atoms, or an amino group having from 1 to 10 carbon atoms; further more preferably a hydrogen atom, an alkyl group having from 1 to 6 carbon atoms, an alkenyl group having from 2 to 6 carbon atoms, a hydroxyl group, an ether group having from 1 to 6 carbon atoms, or an amino group having from 1 to 6 carbon atoms; still further preferably a hydrogen atom, an alkyl group having from 1 to 3 carbon atoms, a hydroxyl group or an ether group having from 1 to 3 carbon atoms; even further preferably a hydrogen atom or a methyl group; most preferably a hydrogen atom.

Preferably, $X^{211}$ and $X^{212}$ each are —O—, —S— or —N($R^{220}$)— in which $R^{220}$ is a hydrogen atom, an aliphatic group having from 1 to 20 carbon atoms or an aromatic group having from 6 to 20 carbon atoms; more preferably —O—, —S— or —N($R^{220}$)—, in which $R^{220}$ is a hydrogen atom, an alkyl group having from 1 to 10 carbon atoms or an alkenyl group having from 2 to 10 carbon atoms; even more preferably —O— or —N($R^{220}$)—, in which $R^{220}$ is a hydrogen atom, an alkyl group having from 1 to 6 carbon atoms; still more preferably —O— or —N($R^{220}$)—, in which $R^{220}$ is a hydrogen atom, an alkyl group having from 1 to 3 carbon atoms; most preferably —O—.

$R^{219}$ is preferably a hydrogen atom, an aliphatic group having from 1 to 20 carbon atoms, or an aromatic group having from 6 to 20 carbon atoms; more preferably a hydrogen atom, an aliphatic group having from 1 to 10 carbon atoms, or an aromatic group having from 6 to 10 carbon atoms; even more preferably a hydrogen atom, an alkyl group having from 1 to 10 carbon atoms, or an alkenyl group having from 2 to 10 carbon atoms; still more preferably a hydrogen atom, or an alkyl group having from 1 to 6 carbon atoms; further more preferably a hydrogen atom or an alkyl group having from 1 to 3 carbon atoms; even further preferably a hydrogen atom or a methyl group.

n211 indicates an integer of 2 or more (preferably from 2 to 20); n212 indicates an integer of 1 or more (preferably from 1 to 20). More preferably, n211 is from 2 to 6, even more preferably from 2 to 4, still more preferably 2 or 3. n212 is more preferably from 1 to 20, even more preferably from 1 to 10, still more preferably from 1 to 6, further more preferably from 1 to 4, even further preferably from 1 to 3; still further preferably 1 or 2; most preferably 1.

Examples of the compounds of formula (I) are mentioned below, to which, however, the invention should not be limited.

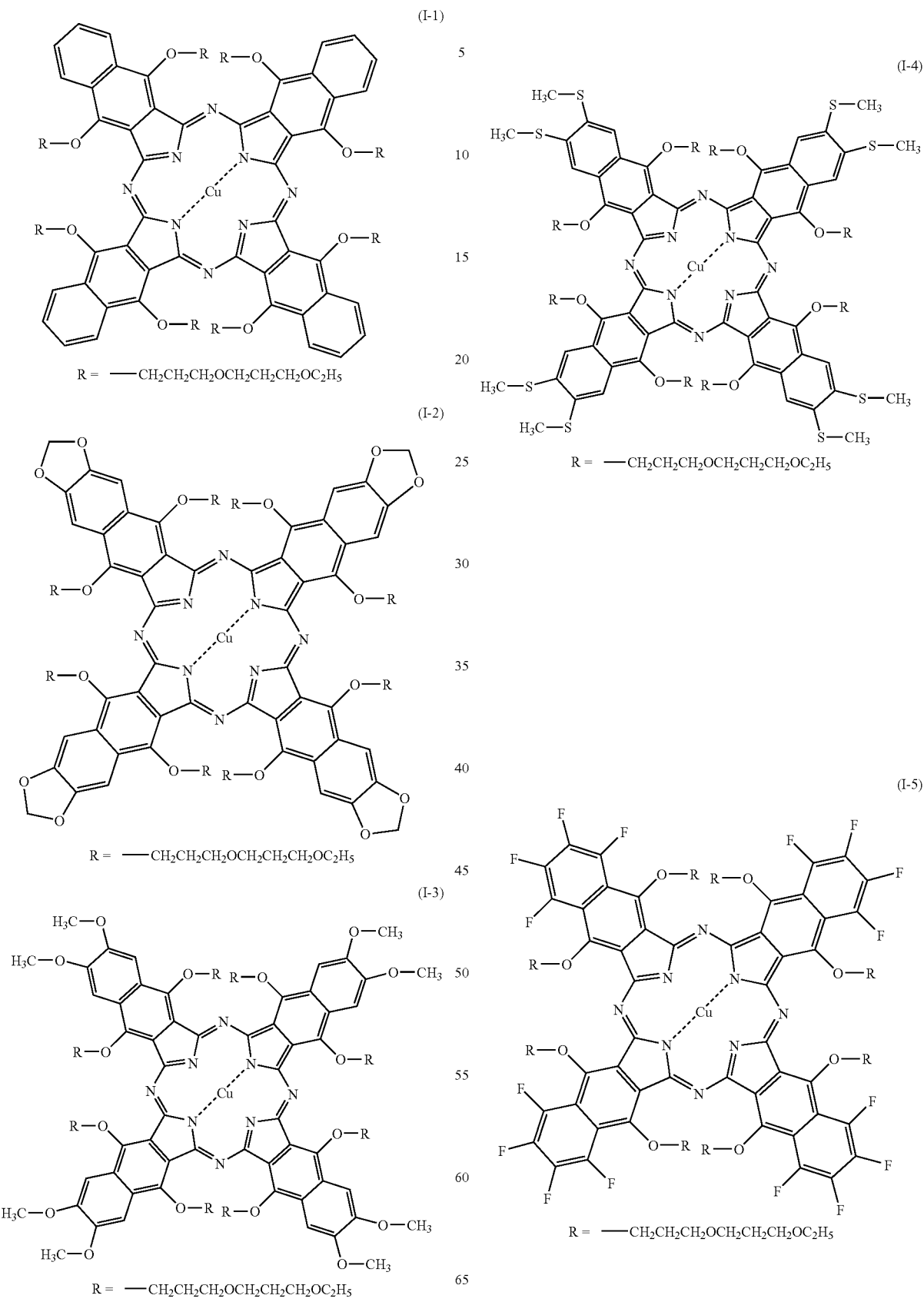

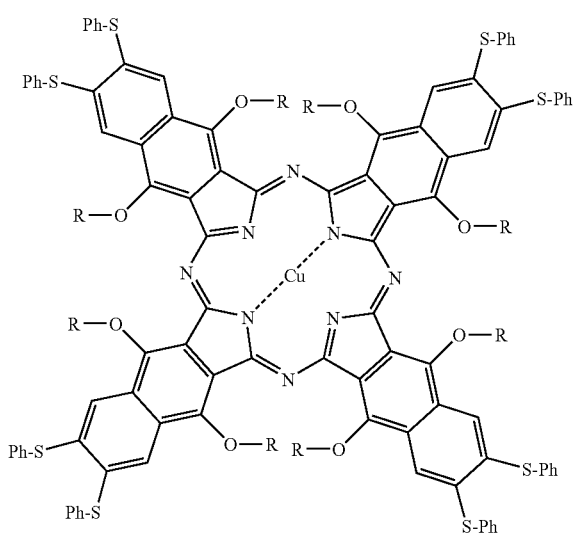
(I-6)
R = —CH₂CH₂CH₂OCH₂CH₂CH₂OC₂H₅
(Ph = phenyl)
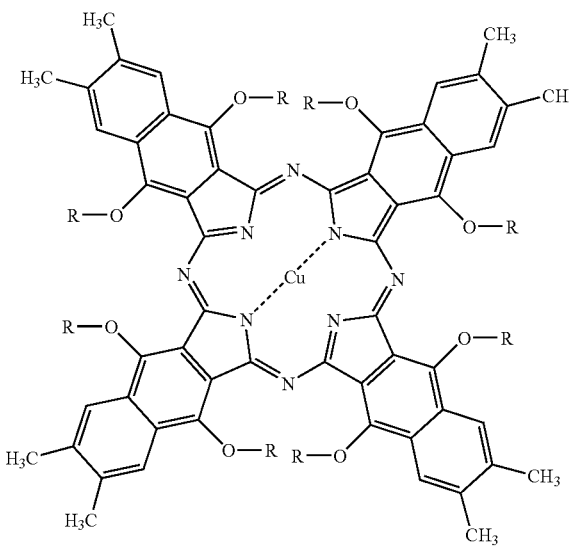
(I-7)
R = —CH₂CH₂CH₂OCH₂CH₂CH₂OC₂H₅
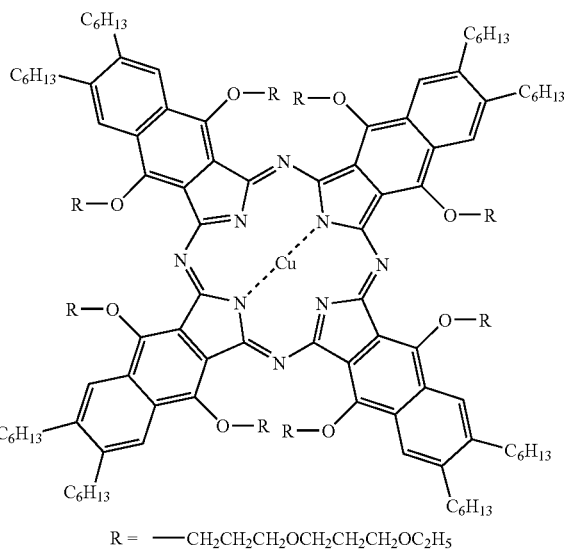
(I-8)
R = —CH₂CH₂CH₂OCH₂CH₂CH₂OC₂H₅
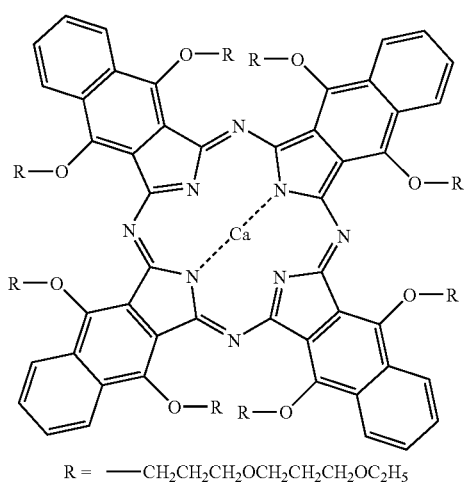
(I-9)
R = —CH₂CH₂CH₂OCH₂CH₂CH₂OC₂H₅
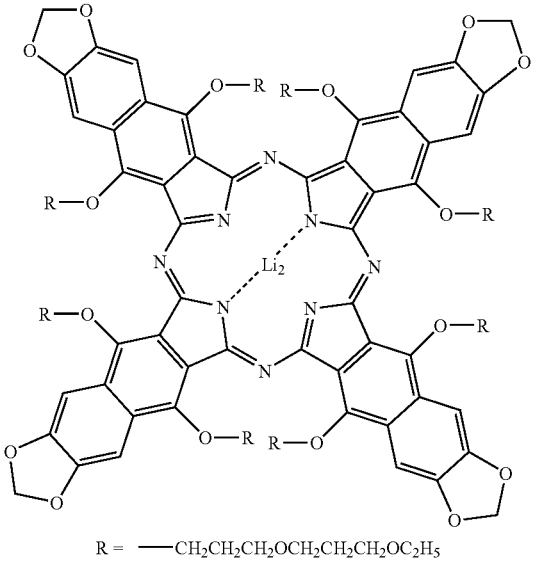
(I-10)
R = —CH₂CH₂CH₂OCH₂CH₂CH₂OC₂H₅

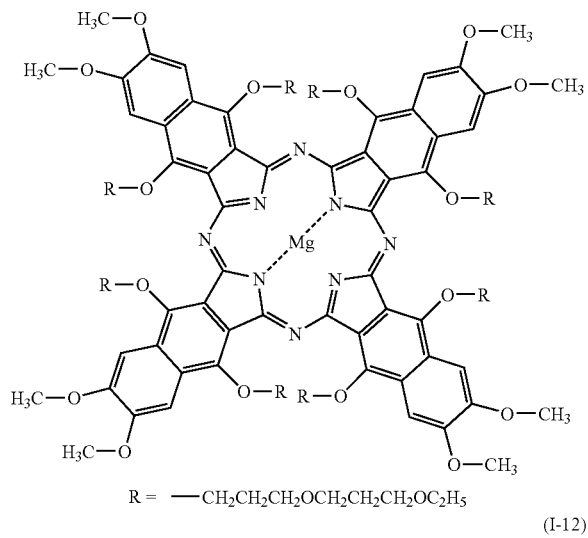
(I-11)
R = —CH₂CH₂CH₂OCH₂CH₂OC₂H₅
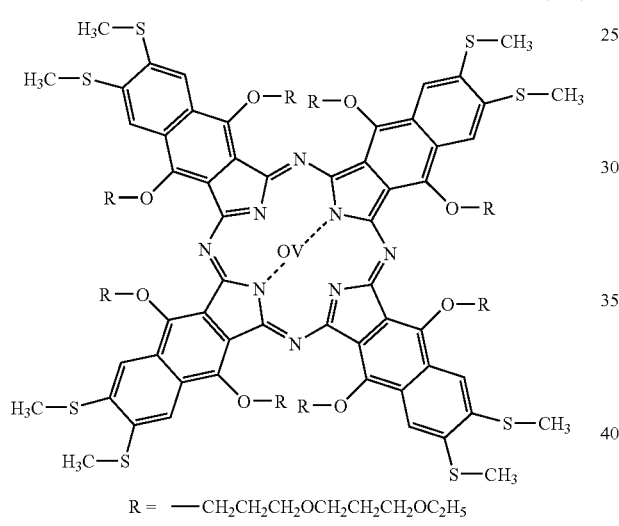
(I-12)
R = —CH₂CH₂CH₂OCH₂CH₂OC₂H₅
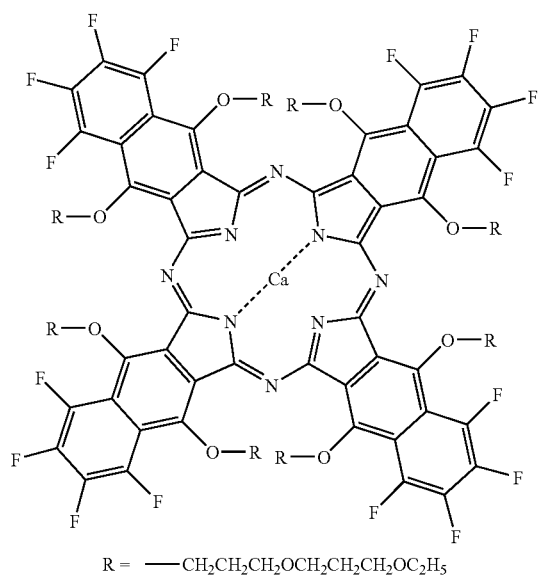
(I-13)
R = —CH₂CH₂CH₂OCH₂CH₂OC₂H₅
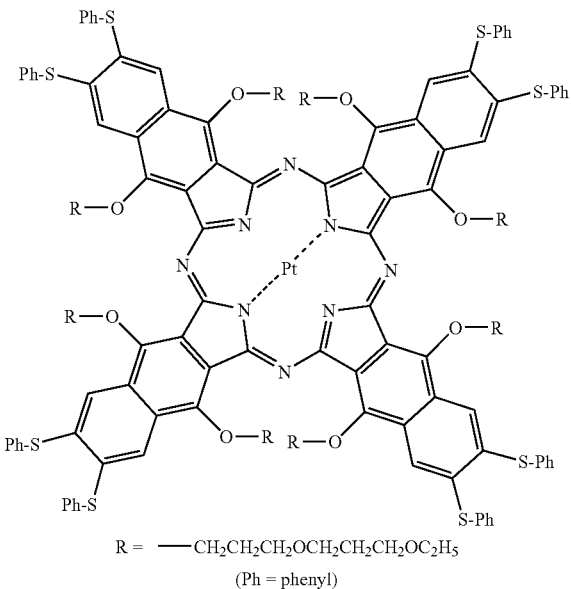
(I-14)
R = —CH₂CH₂CH₂OCH₂CH₂OC₂H₅
(Ph = phenyl)
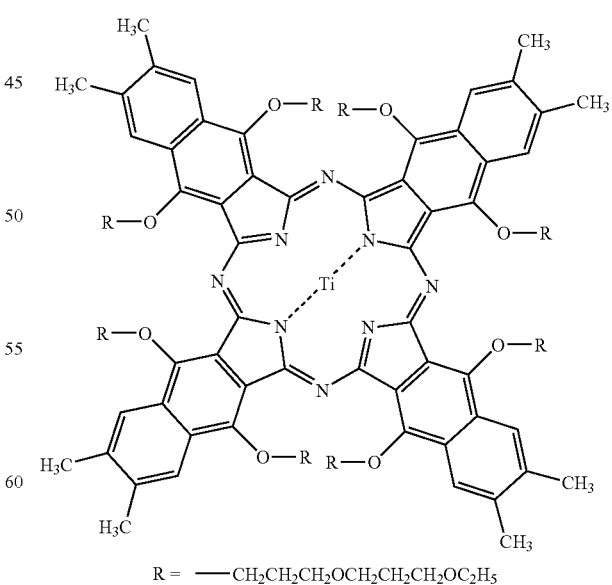
(I-15)
R = —CH₂CH₂CH₂OCH₂CH₂OC₂H₅

-continued
(I-16)
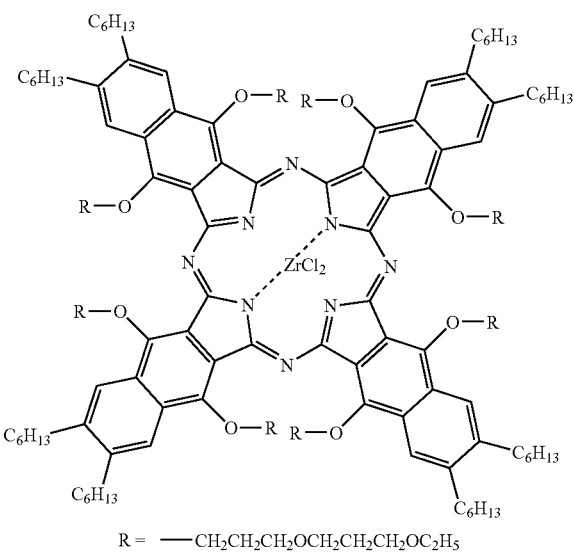
R = —CH$_2$CH$_2$CH$_2$OCH$_2$CH$_2$CH$_2$OC$_2$H$_5$
(I-17)
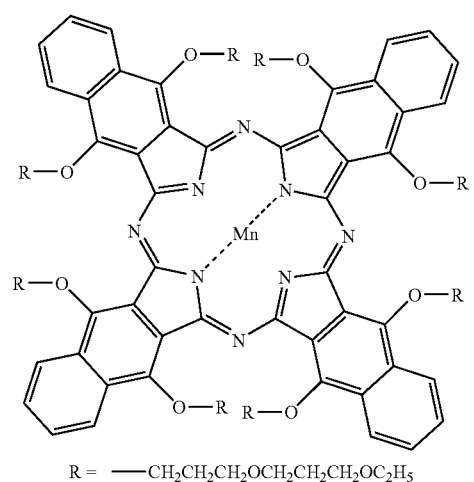
R = —CH$_2$CH$_2$CH$_2$OCH$_2$CH$_2$CH$_2$OC$_2$H$_5$
(I-18)
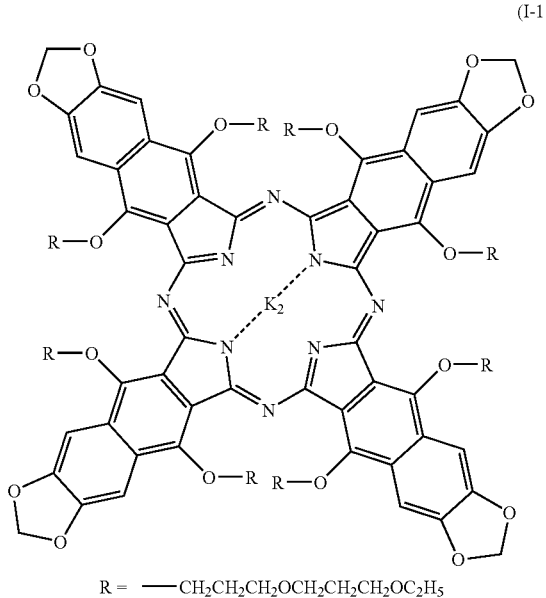
R = —CH$_2$CH$_2$CH$_2$OCH$_2$CH$_2$CH$_2$OC$_2$H$_5$
-continued
(I-19)
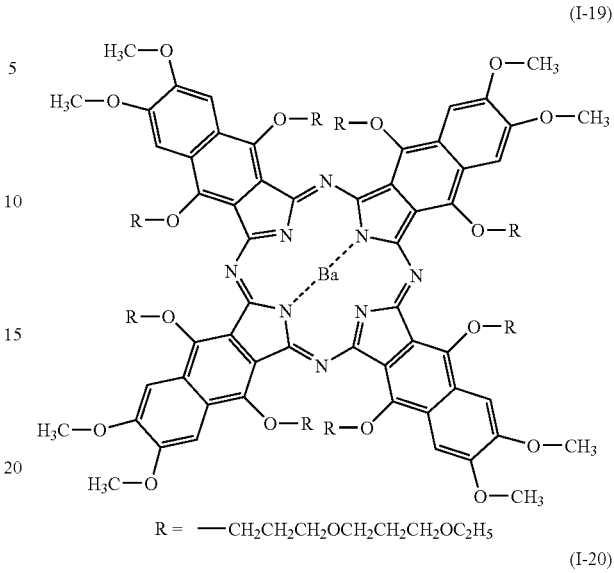
R = —CH$_2$CH$_2$CH$_2$OCH$_2$CH$_2$CH$_2$OC$_2$H$_5$
(I-20)
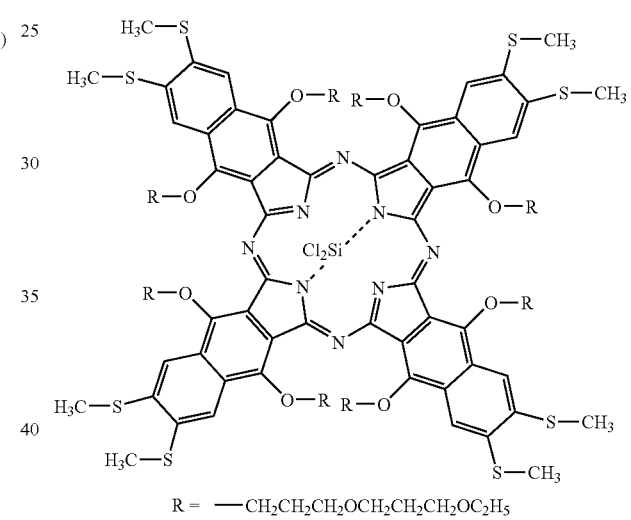
R = —CH$_2$CH$_2$CH$_2$OCH$_2$CH$_2$CH$_2$OC$_2$H$_5$
(I-21)
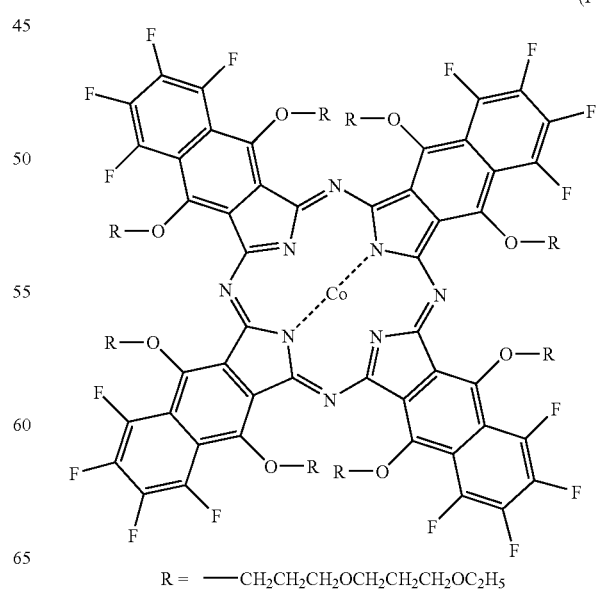
R = —CH$_2$CH$_2$CH$_2$OCH$_2$CH$_2$CH$_2$OC$_2$H$_5$ -continued
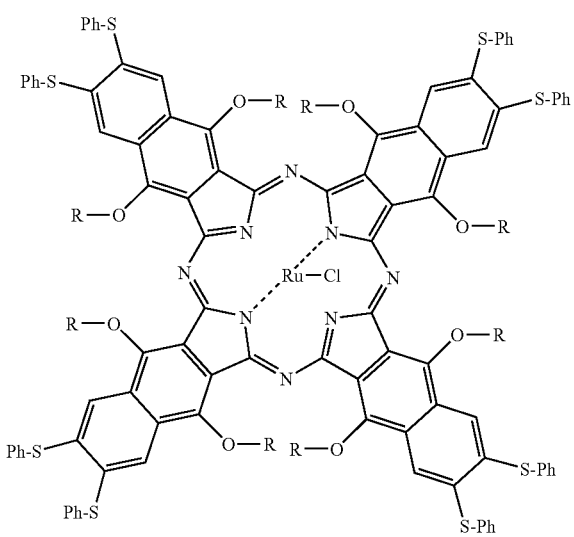
(I-22)
R = —CH₂CH₂CH₂OCH₂CH₂CH₂OC₂H₅
(Ph = phenyl)
(I-23)
R = —CH₂CH₂CH₂OCH₂CH₂CH₂OC₂H₅
-continued
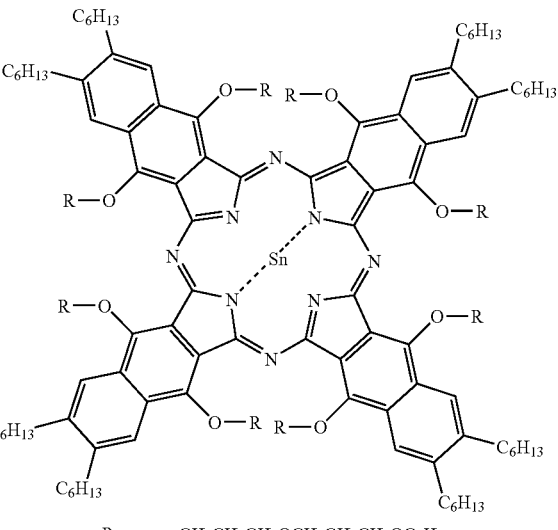
(I-24)
R = —CH₂CH₂CH₂OCH₂CH₂CH₂OC₂H₅
(I-25)
R = —CH₂CH₂CH₂OCH₂CH(CH₃)OH
(I-26)
R = —CH₂CH₂CH₂OCH₂CH(CH₃)OCH₃

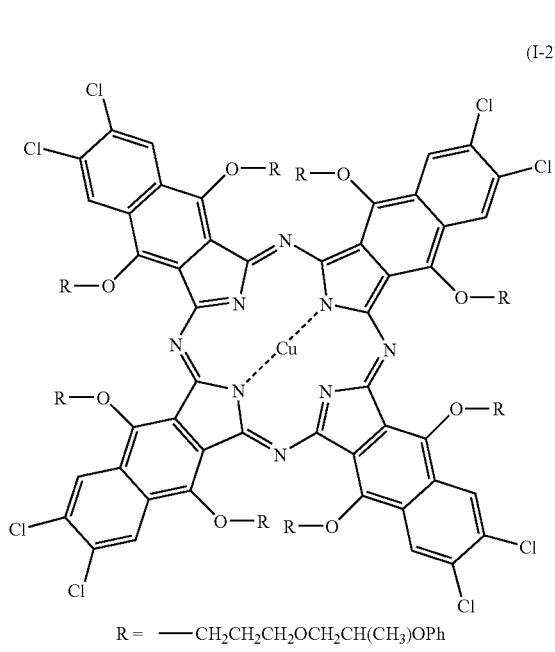
(I-27)
R = —CH$_2$CH$_2$CH$_2$OCH$_2$CH(CH$_3$)OPh
(Ph = phenyl)
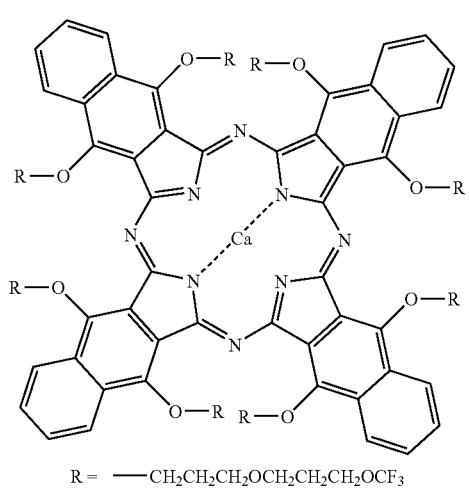
(I-29)
R = —CH$_2$CH$_2$CH$_2$OCH$_2$CH$_2$CH$_2$OCF$_3$
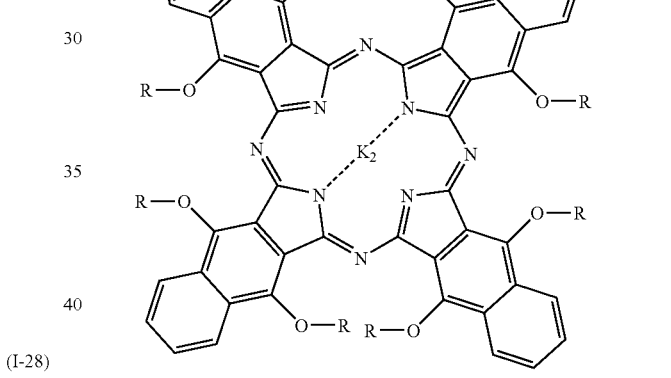
(I-30)
R = —CH$_2$CH$_2$CH$_2$OCH(CH$_3$)CH$_2$OH
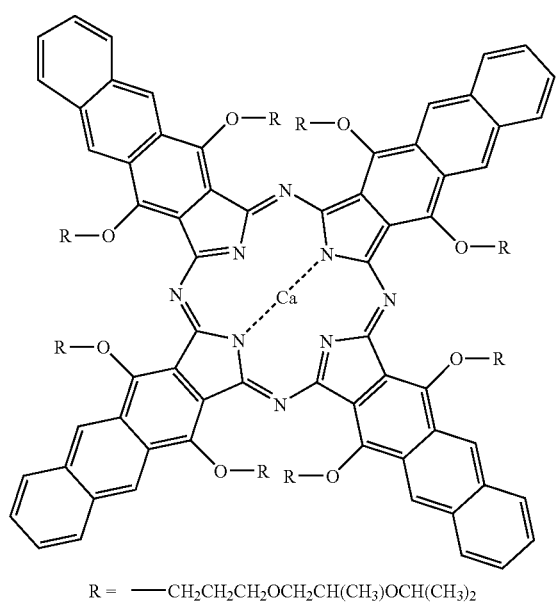
(I-28)
R = —CH$_2$CH$_2$CH$_2$OCH$_2$CH(CH$_3$)OCH(CH$_3$)$_2$
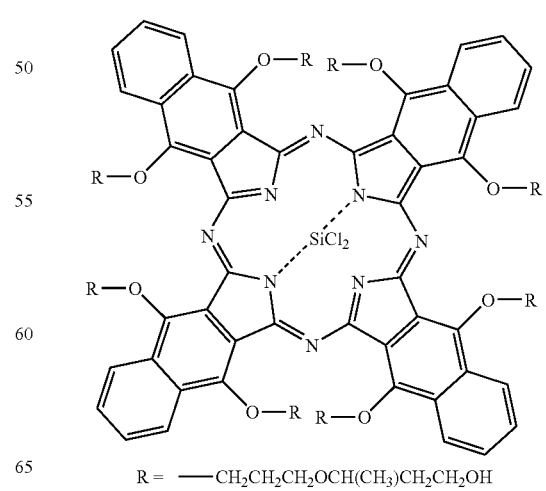
(I-31)
R = —CH$_2$CH$_2$CH$_2$OCH(CH$_3$)CH$_2$OH

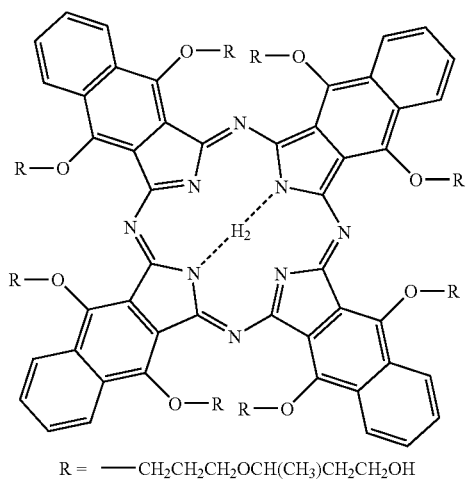
(I-32)
R = —CH₂CH₂CH₂OCH(CH₃)CH₂OH
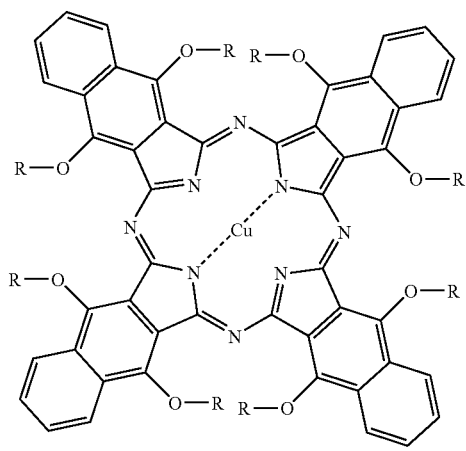
(I-33)
R = —CH₂CH₂CH₂OCH₂CH₂CH₂OCHPh₂
(Ph = phenyl)
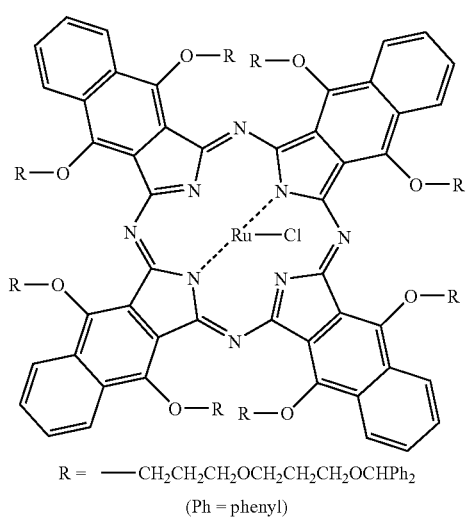
(I-34)
R = —CH₂CH₂CH₂OCH₂CH₂CH₂OCHPh₂
(Ph = phenyl)
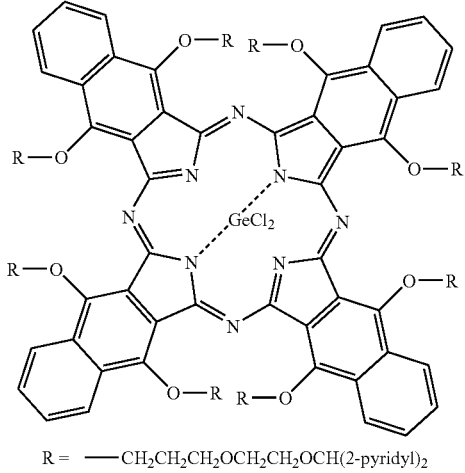
(I-35)
R = —CH₂CH₂CH₂OCH₂CH₂OCH(2-pyridyl)₂
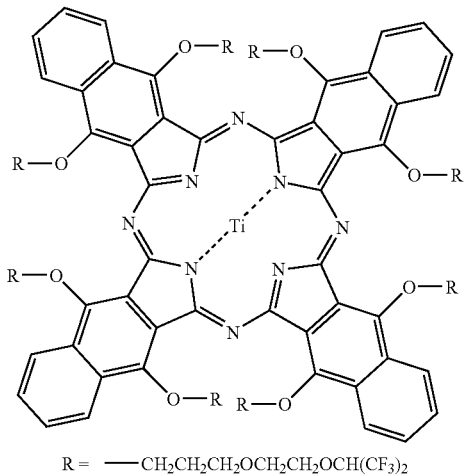
(I-36)
R = —CH₂CH₂CH₂OCH₂CH₂OCH(CF₃)₂
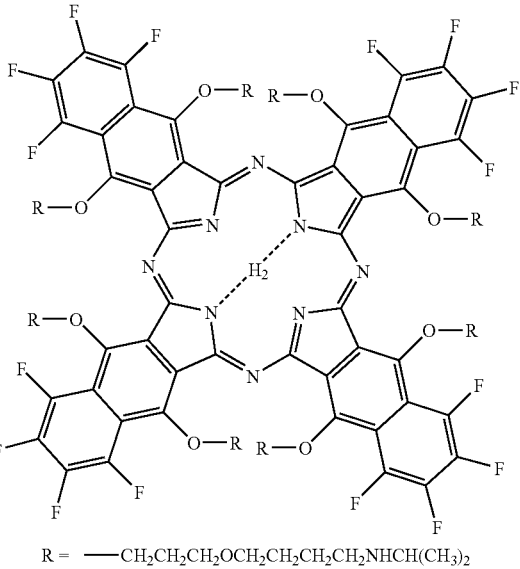
(I-37)
R = —CH₂CH₂CH₂OCH₂CH₂CH₂NHCH(CH₃)₂

-continued

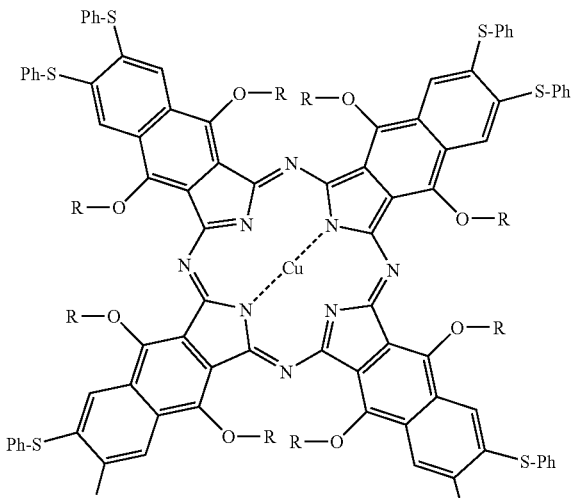

(I-38)

R = —CH₂CH₂CH₂N(CH₃)CH₂CH₂CH₂N(CH₃)CH₂CH(CH₃)₂

(Ph = phenyl)

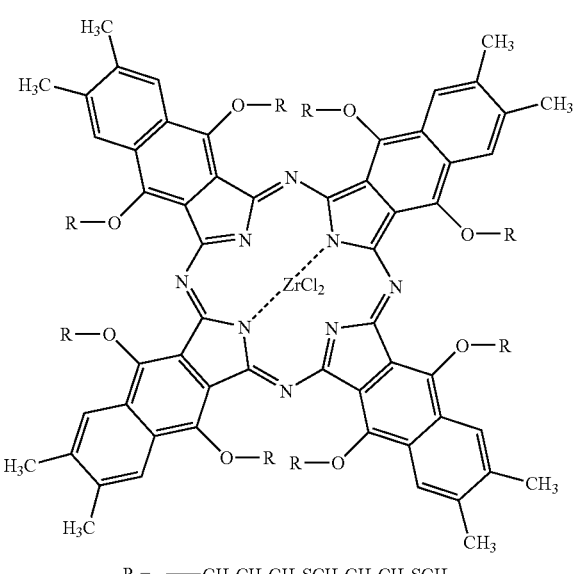

(I-39)

R = —CH₂CH₂CH₂SCH₂CH₂CH₂SCH₃

-continued

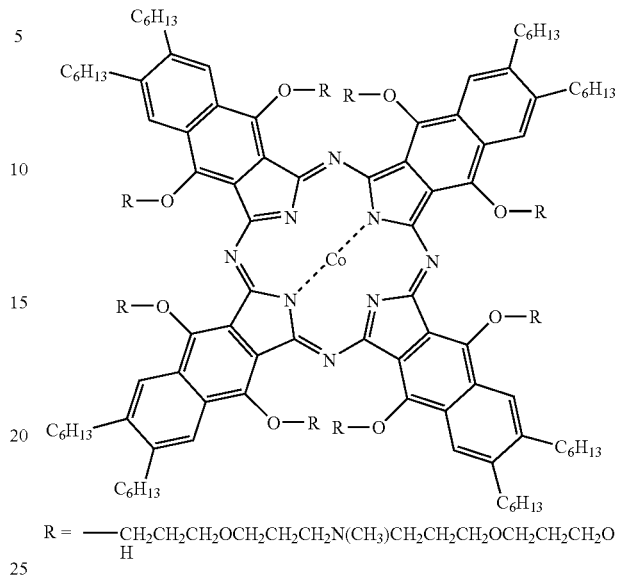

(I-40)

R = —CH₂CH₂CH₂OCH₂CH₂CH₂N(CH₃)CH₂CH₂CH₂OCH₂CH₂CH₂O
H

The method for producing the compound of formula (I) is described below.

The compound of formula (I) having a metal at the center thereof may be directly produced from the corresponding 2,3-naphthalenedicarboxylic acid or its derivative (e.g., acid anhydride, diamide, dinitrile) in the presence of a metal compound. For example, the compound may be produced with reference to Chemistry: A. European Journal, Vol. 9, pp. 5123-5134 (2003). Alternatively, the compound may be produced by first preparing a metal-free naphthalocyanine compound, or that is, a compound of the above-mentioned formula (III) using a lithium compound, and then reacting it with a metal compound to be mentioned hereinunder, as in Journal of Chemical Society, Parkin Transaction, I, pp. 2453-2458 (1988). This method is more preferred in the invention.

In case where the compound of formula (I) is produced from the compound of formula (III) and a metal compound, the amount of the metal compound is preferably from 0.1 to 10 mols, more preferably from 0.5 to 5 mols, even more preferably from 1 to 3 mols relative to one mol of the compound of formula (III). The metal compound may be an inorganic or organic metal compound, including, for example, halides (e.g., chlorides, bromides), sulfates, nitrates, cyanides, acetates, metal acetylacetonate complexes. Preferred are chlorides, sulfates, cyanides, acetates; more preferred are chlorides and acetates; most preferred are acetates.

The solvent for the reaction includes, for example, amide solvents (e.g., N,N-dimethylformamide, N,N-dimethylacetamide, 1-methyl-2-pyrrolidone), sulfone solvents (e.g., sulforane), sulfoxide solvents (e.g., dimethyl sulfoxide), ether solvents (e.g., dioxane, cyclopentyl methyl ether), ketone solvents (e.g., acetone, cyclohexanone), hydrocarbon solvents (e.g., toluene, xylene), halogen-containing solvents (e.g., tetrachloroethane, chlorobenzene), alcohol solvents (e.g., 1-butanol, ethylene glycol, cyclohexanol), pyridine solvents (e.g., pyridine, γ-picoline, 2,6-lutidine). One or more such solvents may be used either singly or as combined. Of those, preferred are amide solvents, sulfone solvents, ether solvents, hydrocarbon solvents, halogen-containing solvents, pyridine solvents; more preferred are sulfone solvents, ether solvents, hydrocarbon solvents, halogen-containing solvents; even more preferred are ether solvents, hydrocarbon solvents, halogen-containing solvents; still more preferred are halogen-containing solvents; most preferred is chlorobenzene.

The reaction temperature is preferably from −30 to 250° C., more preferably from 0 to 200° C., even more preferably from 20 to 150° C., still more preferably from 50 to 100° C. The reaction time may be generally from 5 minutes to 30 hours.

EXAMPLES

The characteristics of the invention are described more concretely with reference to the following Examples. In the following Examples, the material used, its amount and ratio, the details of the treatment and the treatment process may be suitably modified or changed not overstepping the sprit and the scope of the invention. Accordingly, the invention should not be limited to the Examples mentioned below.

Example 1

Production of Compound (I-1)

Compound (I-1) was produced according to the following scheme.

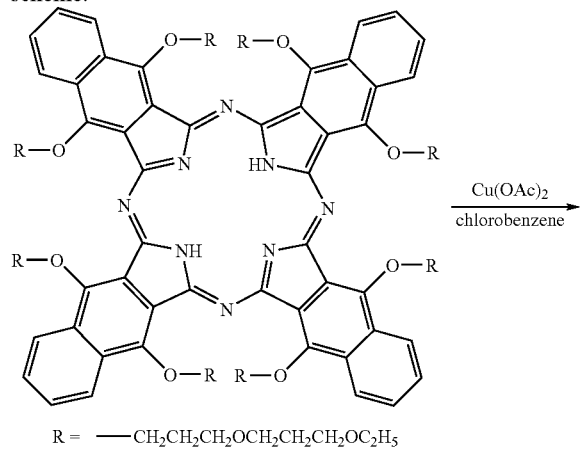

59.9 g of the compound (1), 43.6 g of anhydrous copper(II) acetate and 2000 ml of chlorobenzene were put into a 3-neck flask, stirred under heat at an inner temperature of 85° C. for 40 hours, then cooled to an inner temperature of 20° C., and 2000 ml of water was added to it for extraction. The resulting organic layer was dried with anhydrous magnesium sulfate, concentrated with a rotary evaporator, 600 ml of acetonitrile was added to the resulting residue and stirred, and the resulting crystal was taken out through filtration and dried to obtain 56.8 g of the intended compound (I-1) (yield, 92%). Its mass spectrum gave $M^+=2{,}055$ (main peak).

Example 2

Production of Compound (I-1)

37.0 g of the intended compound (I-1) was obtained (yield, 60%) in the same manner as in Example 1, for which, however, anhydrous copper (II) acetate was changed to 24.2 g of copper (II) chloride.

Example 3

Production of Compound (I-1)

40.7 g of the intended compound (I-1) was obtained (yield, 66%) in the same manner as in Example 1, for which, however, toluene was used in place of chlorobenzene and the system was heated under reflux for 50 hours, but not at 85° C. for 40 hours.

Example 4

Production of Compound (I-1)

43.8 g of the intended compound (I-1) was obtained (yield, 71%) in the same manner as in Example 1, for which, however, 1,2-dichloroethane was used in place of chlorobenzene and the system was heated and stirred under reflux for 43 hours, but not at an internal temperature of 85° C. for 40 hours.

Example 5

Production of Compound (I-9)

Compound (I-9) was produced according to the following scheme.

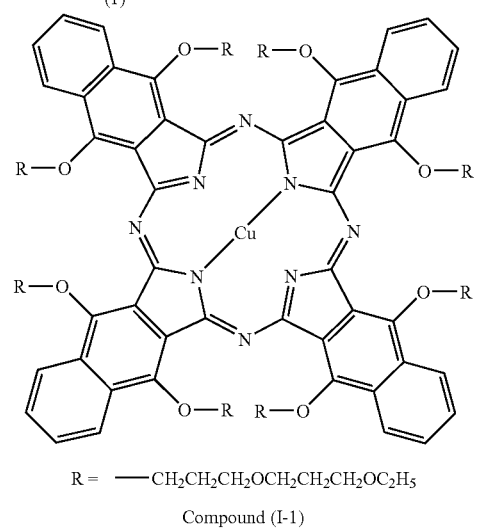

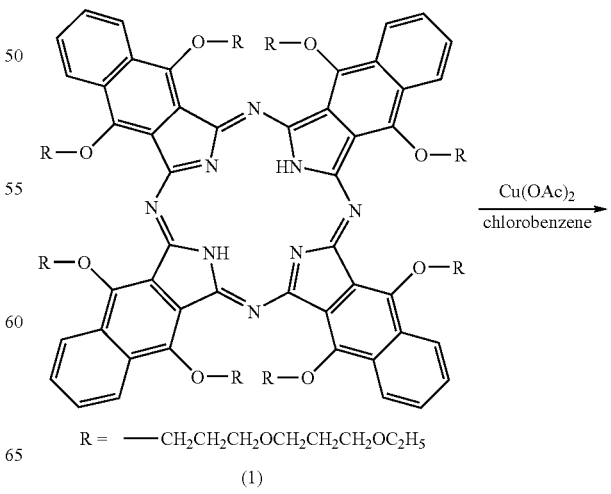

-continued

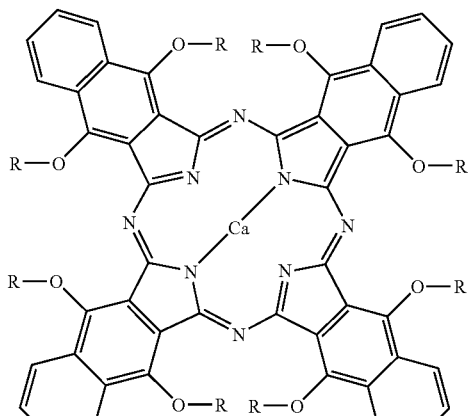

R = —CH$_2$CH$_2$CH$_2$OCH$_2$CH$_2$CH$_2$OC$_2$H$_5$

Compound (I-9)

45.5 g of the compound (1), 43.6 g of calcium acetate hydrate and 2000 ml of chlorobenzene were put into a 3-neck flask, stirred under heat at an inner temperature of 85° C. for 30 hours, then cooled to an inner temperature of 20° C., and 2000 ml of water was added to it for extraction. The resulting organic layer was dried with anhydrous magnesium sulfate, concentrated with a rotary evaporator, 600 ml of acetonitrile was added to the resulting residue and stirred, and the resulting crystal was taken out through filtration and dried to obtain 54.9 g of the intended compound (1-9) (yield, 90%). Its mass spectrum gave $M^+$=2,032 (main peak).

Example 6

Production of Compound (I-9)

52.5 g of the intended compound (I-9) was obtained (yield, 86%) in the same manner as in Example 5, for which, however, toluene was used in place of chlorobenzene and the system was heated under reflux for 30 hours, but not at 85° C. for 30 hours.

Example 7

Production of Compound (I-9)

49.4 g of the intended compound (I-9) was obtained (yield, 81%) in the same manner as in Example 5, for which, however, 1,2-dichloroethane was used in place of chlorobenzene and the system was heated and stirred under reflux for 32 hours, but not at an internal temperature of 85° C. for 30 hours.

Example 8

Production of Compound (I-17)

Compound (I-17) was produced according to the following scheme.

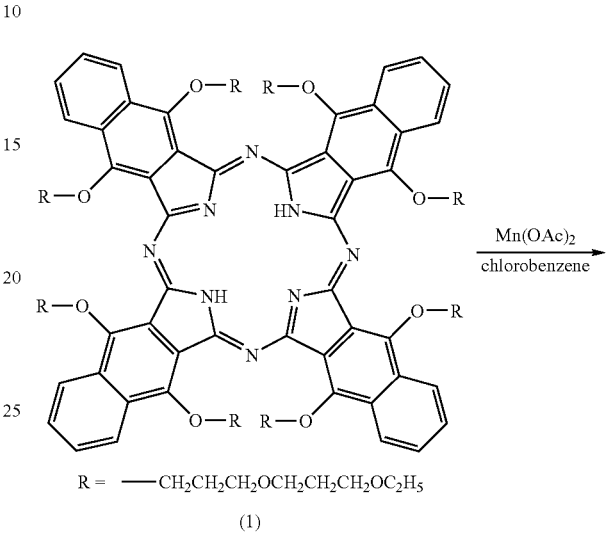

R = —CH$_2$CH$_2$CH$_2$OCH$_2$CH$_2$CH$_2$OC$_2$H$_5$ (1)

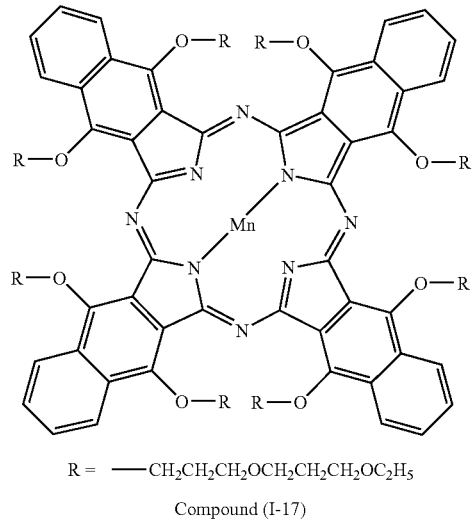

R = —CH$_2$CH$_2$CH$_2$OCH$_2$CH$_2$CH$_2$OC$_2$H$_5$

Compound (I-17)

45.5 g of the compound (1), 26.0 g of anhydrous manganese (II) acetate and 2000 ml of chlorobenzene were put into a 3-neck flask, stirred under heat at an inner temperature of 85° C. for 35 hours, then cooled to an inner temperature of 20° C., and 2000 ml of water was added to it for extraction. The resulting organic layer was dried with anhydrous magnesium sulfate, concentrated with a rotary evaporator, 600 ml of acetonitrile was added to the resulting residue and stirred, and the resulting crystal was taken out through filtration and dried to obtain 52.3 g of the intended compound (1-17) (yield, 85%). Its mass spectrum gave $M^+$=2,047 (main peak).

Example 9

Production of Compound (I-17)

49.2 g of the intended compound (I-17) was obtained (yield, 80%) in the same manner as in Example 8, for which, however, toluene was used in place of chlorobenzene and the system was heated under reflux for 35 hours, but not at 85° C. for 35 hours.

Example 10

Production of Compound (I-17)

46.7 g of the intended compound (I-17) was obtained (yield, 76%) in the same manner as in Example 8, for which, however, 1,2-dichloroethane was used in place of chlorobenzene and the system was heated and stirred under reflux for 35 hours, but not at an internal temperature of 85° C. for 35 hours.

Example 11

A resin shaped article was obtained in the same manner as in Example 22 in JP-A-9-316049, for which, however, any of the compounds (I-1), (I-9) and (I-17) of the invention was used in place of the phthalocyanine compound therein. It was confirmed that the thus-obtained resin shaped articles effectively absorb near-IR rays at 750 to 1100 nm.

INDUSTRIAL APPLICABILITY

The compound of the invention is useful for image-forming materials, IR-sensitive thermal recording materials, optical recording elements and optical film materials, and therefore can be effectively used for production of such materials and elements. The compound of the invention can be produced in a simplified manner according to the production method of the invention. Accordingly, the industrial applicability of the invention is great.

The invention claimed is:

1. A naphthalocyanine compound of the following formula (1):

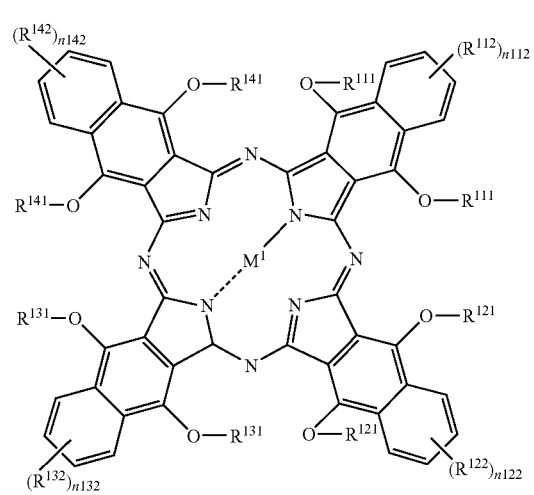

(I)

wherein $R^{111}$, $R^{121}$, $R^{131}$ and $R^{141}$ each independently represents a group of the following formula (II); $R^{112}$, $R^{122}$, $R^{132}$ and $R^{142}$ each independently represents a substituent selected from the group recited below; $M^1$ represents two monovalent metal atoms, a divalent metal atom, or a substituted metal atom including a trivalent or tetravalent metal atom, but $M^1$ is not a divalent zinc; n112, n122, n132 and n142 each independently indicates an integer of from 0 to 4:

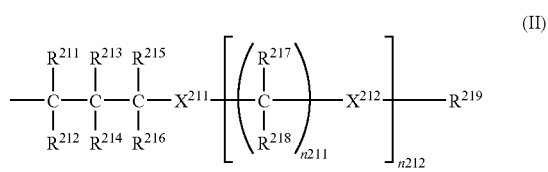

(II)

wherein $R^{211}$, $R^{212}$, $R^{213}$, $R^{214}$, $R^{215}$, $R^{216}$, $R^{217}$ and $R^{218}$ each independently represents a hydrogen atom or a substituent selected from the group recited below; $X^{211}$ and $X^{212}$ each independently represents —O—, —S— or —N($R^{220}$)—; $R^{219}$ and $R^{220}$ each independently represents a hydrogen atom, an aliphatic group, an aromatic group, or a 5-membered or 6-membered heterocyclic group having at least one of B, N, O, S, Se and Te that bonds via its carbon atom;

n211 indicates an integer of 2 or more; n212 indicates an integer of 1 or more; when the formula has plural $R^{217}$'s, $R^{218}$'s, $R^{220}$'s $X^{212}$'s or n211's, then the plural $R^{217}$'s, the plural $R^{218}$'s, the plural $R^{220}$'s, the plural $X^{212}$'s and the plural n211's may be the same or different; $R^{211}$ and $R^{212}$ bonding to the α-positioned carbon atom relative to the oxygen atom bonding to the naphthalene ring of the naphthalocyanine skeleton are both hydrogen atoms; and wherein the substituent represented by $R^{112}$, $R^{122}$, $R^{132}$, $R^{142}$, $R^{211}$, $R^{212}$, $R^{213}$, $R^{214}$, $R^{215}$, $R^{216}$, $R^{217}$ and $R^{218}$, each independently, is selected from the group consisting of a halogen atom, an alkyl group, an alkenyl group, an alkynyl group, an aryl group, a heterocyclic group, a cyano group, a hydroxyl group, a nitro group, a carboxyl group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic-thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic-azo group, an imido group, a phosphino group, a phosphinyl group, a phosphinyloxy group, a phosphinylamino group, and a silyl group.

2. The naphthalocyanine compound according to claim 1, wherein $M^1$ is a divalent copper atom.

3. The naphthalocyanine compound according to claim 1, wherein $X^{211}$ and $X^{212}$ are all —O—.

4. The naphthalocyanine compound according to claim 1, wherein n112, n122, n132 and n142 are all 0.

5. A method for producing a naphthalocyanine compound of the following formula (IA), which comprises reacting a compound of the following formula (III) with a metal compound, said metal compound being a halide of $M^2$, a sulfate of $M^2$, a nitrate of $M^2$, a cyanide of $M^2$, an acetate of $M^2$ or an acetylacetonate of $M^2$:

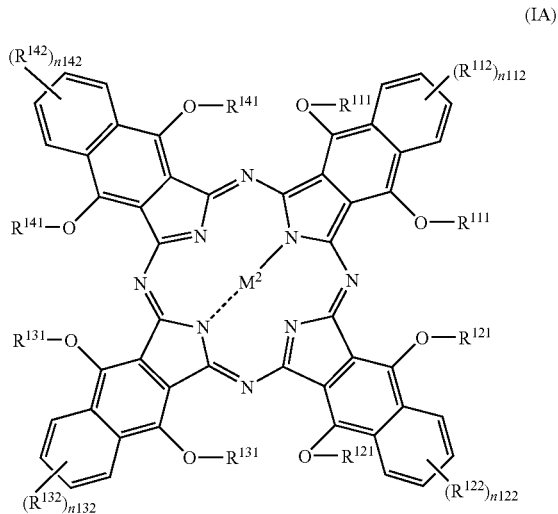

(IA)

wherein $R^{111}$, $R^{121}$, $R^{131}$ and $R^{141}$ each independently represents a group of the following formula (II); $R^{112}$, $R^{122}$, $R^{132}$ and $R^{142}$ each independently represents a substituent selected from the group recited below; $M^2$ represents a divalent metal atom, or a substituted metal atom including a trivalent or tetravalent metal atom, but $M^2$ is not a divalent zinc; n112, n122, n132 and n142 each independently indicates an integer of from 0 to 4:

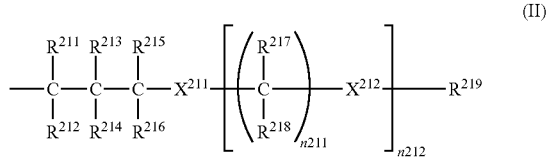

(II)

wherein $R^{211}$, $R^{212}$, $R213$, $R^{214}$, $R^{215}$, $R^{216}$, $R^{217}$ and $R^{218}$ each independently represents a hydrogen atom or a substituent selected from the group recited below; $X^{211}$ and $X^{212}$ each independently represents —O—, —S— or —N($R^{220}$)-; $R^{219}$ and $R^{220}$ each independently represents a hydrogen atom, an aliphatic group, an aromatic group, or a 5-membered or 6-membered heterocyclic group having at least one of B, N, O, S, Se and Te that bonds via its carbon atom;

n211 indicates an integer of 2 or more; n212 indicates an integer of 1 or more; when the formula has plural $R^{217}$'s, $R^{218}$'s, $R^{220}$'s, $X^{212}$'s and n211's, then the plural $R^{217}$'s, the plural $R^{218}$'s, the plural $R^{220}$'s, the plural $X^{212}$'s and the plural n211's may be the same or different; $R^{211}$ and $R^{212}$ bonding to the α-positioned carbon atom relative to the oxygen atom bonding to the naphthalene ring of the naphthalocyanine skeleton are both hydrogen atoms,

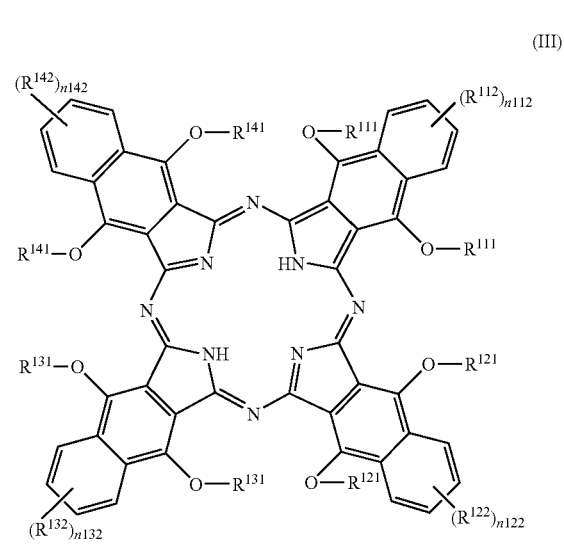

(III)

wherein $R^{111}$, $R^{112}$, $R^{121}$, $R^{122}$, $R^{131}$, $R^{132}$, $R^{141}$, $R^{142}$, n112, n122, n132 and n142 have the same meanings as in formula (IA); and wherein the substituent represented by $R^{112}$, $R^{122}$, $R^{132}$, $R^{142}$, $R^{211}$, $R^{212}$, $R^{213}$, $R^{214}$, $R^{215}$, $R^{216}$, $R^{217}$ and $R^{218}$, each independently, is selected from the group consisting of a halogen atom, an alkyl group, an alkenyl group, an alkynyl group, an aryl group, a heterocyclic group, a cyano group, a hydroxyl group, a nitro group, a carboxyl group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic-thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic-azo group, an imido group, a phosphino group, a phosphinyl group, a phosphinyloxy group, a phosphinylamino group, and a silyl group.

6. The method according to claim 5, wherein the metal compound is an acetate salt.

* * * * *